(12) United States Patent
Sievers et al.

(10) Patent No.: US 11,237,832 B2
(45) Date of Patent: Feb. 1, 2022

(54) MODULE WITH A SERIALIZATION UNIT AND IMPROVED COMPATIBILITY WITH DESERIALIZATION UNITS OF DIFFERENT SERIES

(71) Applicant: dSPACE digital signal processing and control engineering GmbH, Paderborn (DE)

(72) Inventors: Gregor Sievers, Paderborn (DE); Johannes Ax, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 0 days.

(21) Appl. No.: 17/105,861

(22) Filed: Nov. 27, 2020

(65) Prior Publication Data
US 2021/0165657 A1 Jun. 3, 2021

(30) Foreign Application Priority Data
Nov. 29, 2019 (DE) ...................... 10 2019 132 476.9

(51) Int. Cl.
*G06F 16/2455* (2019.01)
*G06F 9/30* (2018.01)
(Continued)

(52) U.S. Cl.
CPC ...... *G06F 9/30087* (2013.01); *G06F 9/30101* (2013.01); *G06F 9/44505* (2013.01); *G06F 13/4282* (2013.01)

(58) Field of Classification Search
None
See application file for complete search history.

(56) References Cited

U.S. PATENT DOCUMENTS

| 2008/0028127 A1* | 1/2008 | Ware ...................... G06F 3/0683 |
| | | 711/100 |
| 2015/0268878 A1* | 9/2015 | Amit ....................... G06F 3/061 |
| | | 711/114 |

(Continued)

FOREIGN PATENT DOCUMENTS

| CN | 108462660 A | 8/2018 |
| DE | 102016200322 A1 | 7/2017 |

OTHER PUBLICATIONS

German Office Action dated Jul. 28, 2021 in corresponding application 10 2019 132 476.9.
(Continued)

*Primary Examiner* — Hyun Nam
(74) *Attorney, Agent, or Firm* — Muncy, Geissler, Olds & Lowe, P.C.

(57) ABSTRACT

A module with a functional unit for generating a data stream with a data output for outputting the data stream to a serialization unit provided for receiving a data stream from a serialization unit of a first series. A serialization unit of a second series is set up to serialize the data stream and output it through the data output, and a configuration data input receives configuration data defining a first register configuration of a serialization unit. A mapping of register addresses of the serialization unit of the first series to register addresses of the serialization unit of the second series can be stored in a data memory of the module. The configuration unit is set up to read in the configuration data, to use the mapping, and to configure the registers of the serialization unit of the second series according to the configuration of the second register.

11 Claims, 3 Drawing Sheets

(51) Int. Cl.
  *G06F 13/42*   (2006.01)
  *G06F 9/445*   (2018.01)

(56) References Cited

U.S. PATENT DOCUMENTS

| | | | |
|---|---|---|---|
| 2018/0129712 A1* | 5/2018 | Mankovskii | G06F 16/2365 |
| 2018/0331776 A1* | 11/2018 | Wang | H04B 10/25 |
| 2019/0012355 A1 | 1/2019 | Baumgaertner | |
| 2019/0356391 A1* | 11/2019 | Murshid | H04J 14/0205 |

OTHER PUBLICATIONS

Macias, Cole et al: "DS90UB953-Q1 Backwards Compatibility Modes for Operation With Parallel Output Deserializers" SNLA270A, Nov. 2017, Revised Apr. 2018, Texas Instruments Incorporated.

* cited by examiner

MODULE WITH A SERIALIZATION UNIT AND IMPROVED COMPATIBILITY WITH DESERIALIZATION UNITS OF DIFFERENT SERIES

This nonprovisional application claims priority under 35 U.S.C. § 119(a) to German Patent Application No. 10 2019 132 476.9, which was filed in Germany on Nov. 29, 2019, and which is herein incorporated by reference.

BACKGROUND OF THE INVENTION

Field of the Invention

The present invention relates to serialization.

Description of the Background Art

Sensor systems with imaging sensors are used in a variety of ways, for example in monitoring systems and increasingly also in highly automated vehicles. Imaging sensors are to be understood as sensors whose raw data can be used to reconstruct an image of the sensor's environment. Examples are camera sensors, infrared sensors, ultrasonic sensors, RADAR sensors and LIDAR sensors. Such sensor systems generally include a sensor module, which comprises the sensor and is set up to output a data stream of raw sensor data, and a receive module set up to acquire and process the data stream.

It is common practice to serialize the data stream before it is transmitted to the receive module and to deserialize it again after it has been recorded in the receive module. Major suppliers of suitable serializers or deserializers are Texas Instruments (FPD-Link III) and Maxim with the GMSL series.

In particular, for testing and development of image processing sensor systems, there are programmable interface modules on the market that can acquire raw data from an imaging sensor and process it in a manner desired by the user in order to ultimately forward the image data to a receive module, for example a PC, a control unit or simply a display. One example is the Compact Vision System by National Instruments. In the course of the increasing automation of vehicles, a market for sensor simulation systems has recently emerged that can generate synthetic raw data based on a computer model or play back raw data acquired by a real sensor. Such systems emulate the presence of an imaging sensor for a receive module, for example a control unit for an automotive ADAS (Advanced Driving Assistance System), and thus enable safe and reproducible testing of the control unit in a virtual environment. One example is the Environment Sensor Interface Unit (ESI Unit) by dSPACE.

In practice, development systems such as the two previously mentioned are naturally operated with many different receive modules in which different deserializers are installed. This is problematic in terms of compatibility. The serializers can typically be configured using registers, wherein the registers are integrated into a special bus, for example $I^2C$, SPI or UART. In this bus, each register is assigned an address, and each register can be written to and read out via its respective address. The register configuration is done automatically by the receive module after the overall system has been put into operation in that the receive module accesses the registers of the serializer via said special bus and writes them with values in a manner predetermined by its programming. The register configuration can be carried out by the deserializer, which is built into the receive module, or by another component of the receive module.

A serializer of a given series is therefore incompatible with most of the deserializers available on the market or with the receive modules in which the respective deserializer is installed, because the programming of a deserializer that determines the configuration process is based on certain registers of the serializer that can be accessed via certain bus addresses. In the case of universal development systems like the ones mentioned above, one cannot expect that these assumptions are correct. Even if a correct transfer of user data from the serializer to the deserializer is fundamentally technologically possible, both can be incompatible solely because the initial configuration process fails. In the case of the ESI unit, it is currently common practice to install a specially manufactured serializer board for each customer, which fits said customer's receive module. This practice creates additional costs and increased production effort.

SUMMARY OF THE INVENTION

It is therefore an object of the present invention to improve the compatibility of a serializer of a given series with receive modules of as high a number as possible which include deserializers of different series.

To achieve this object, a new type of module with a serialization unit is proposed. In an exemplary embodiment, the module comprises a functional unit for generating a data stream, for example a data stream of raw sensor data, in particular emulated raw sensor data for emulating a sensor. The module also includes a data output for outputting the data stream to a deserialization unit in the periphery of the module. The serialization unit includes registers for configuring the serialization unit and is set up to serialize the data stream and output it through the data output. The module further comprises a configuration data input for receiving configuration data, which data defines a first register configuration of a serialization unit.

The inventive module includes a data memory in which a first mapping of register addresses of a serialization unit of a first series to register addresses of a serialization unit of a second series is stored, wherein the serialization unit actually built on the module belongs to the second series. In contrast, within the scope of the invention, a serialization unit belonging to the first series does not have to be installed on the module and typically is not.

In the context of the present specification, a series can be defined in that two serialization units or deserialization units belonging to a common series are identical or substantially identical in terms of their equipment and technical design.

Furthermore, the module according to the invention comprises a configuration unit which is set up to read in the configuration data from the configuration data input and to translate it into a technically corresponding second register configuration using the mapping stored in the data memory. By means of the second register configuration, the serialization unit of the second series can be configured in such a way that it behaves during operation like a serialization unit of the first series which is configured in accordance with the first register configuration. The configuration unit is further adapted to configure the registers of the serialization unit of the second series in accordance with the second register configuration.

The configuration unit thus serves as a kind of translator. The deserialization unit built into the receive module is set up for use with a serialization unit of a specified first series of a serialization unit, or perhaps also for a limited family of series. If the serialization unit in the module belongs to a second series which is not compatible with the deserialization unit with regard to the register configuration, then the register configuration carried out by the deserialization unit cannot be performed or causes the serialization unit to behave undesirably. Through its programming and using the information contained in the mapping, the configuration unit is enabled to detect and interpret write access to register addresses carried out by the deserialization unit during the configuration process and to translate it into a valid and technically appropriate second register configuration of the serialization unit of the second series, bringing about the desired behavior or at least a satisfactorily similar behavior of the serialization unit, and to configure the registers of the serialization unit of the second series in accordance with the second register configuration.

Similar concepts for redirecting access to bus addresses are known from the prior art. For example, a reprogrammable switch is known from CN 108 462 660 on which a mapping of logical port addresses of the switch can be deposited on physical port addresses. A conventional memory management unit also basically fulfills a similar function.

The information content present in the mapping and applied by the configuration unit, however, generally goes beyond a mere mapping of a set of register addresses to another set of register addresses. In other words, it is generally not sufficient to simply store a value, which the serialization unit tries to store at a specific register address of the first serialization unit, at another register address of the second serialization unit. For example, it may also be necessary to scale a data item written by the deserialization unit, which is to be stored in a register of the serialization unit of the first series, for example, because the serialization unit of the second series uses units other than the serialization unit of the first series, and/or to reformat the data item. It is also possible that information which can be stored on the serialization unit of the first series by a data item stored in a single register, requires the deposit of a value in a plurality of registers in the serialization unit of the second series so as to store the same information, or vice versa—in more general terms: the mapping can contain a mapping of a first data item, which is provided for the storage in a first number of registers of the deserialization unit of the first series, to a second data item, which is provided for the storage in a second number of registers of the deserialization unit of the second series that is different from the first number, so as to bring about the desired technically appropriate behavior of the serialization unit of the second series.

For the deserialization unit, the configuration unit emulates the presence of a serialization unit of a first series, for whose automatic register configuration the deserialization unit is set up, in the module. For this it is important that the register addresses of the serialization unit of the second series actually built into the module differ from the register addresses on which the deserialization unit is set up for the purpose of accessing the register configuration. The deserialization unit is set up to store the configuration data in the module at a set of register addresses which, from the point of view of the deserialization unit, is provided for the registers of the serialization unit of the first series. In the module according to the invention, this set of register addresses points to a storage medium, for example a set of registers of the configuration unit, and the configuration unit is set up to read out the configuration data from the storage medium.

The module according to the invention can be programmed without exchanging the serialization unit of the second series so as to be compatible with a large number of deserialization units of different series. If necessary, it is sufficient to program a new mapping suitable for a certain deserialization unit and to store it on the configuration unit, which is far less complex than designing a new serializer board. A mapping programmed once can also be reused as often as required.

Which options a serialization unit of a given series provides for configuring its technical behavior using the register configuration depends on market requirements and is basically limited solely in terms of technical feasibility. Therefore it is hardly possible to give universally accepted technical guidance for how a mapping should be configured. The specific configuration of the mapping is a human intellectual activity that is dependent on the series of the serialization unit and the deserialization unit as well as the requirements of a customer, but is generally within reason for the person skilled in the art.

The module can include an interface by means of which a new mapping can be stored in the data memory as required. Alternatively, a plurality of mappings can also be stored in the data memory, which can alternatively be read out by the configuration unit in order to make the module compatible with several deserialization units of different series at the same time. In this embodiment, a first mapping of register addresses of a serialization unit of the first series to the register addresses of the serialization unit of the second series is stored on the data memory, as well as at least a second mapping of register addresses of a serialization unit of a third series to the register addresses of the serialization unit of the second series.

The invention also relates to a computer system with a module according to the invention and a receive module with a configuration data output and a deserialization unit set up to receive the data stream. The receive module is set up to output configuration data via the configuration data output in order to configure a serialization unit. A configuration data link is set up between the configuration data output and the configuration data input, which is configured, for example, as an I$^2$C bus, an SPI bus or a UART bus. A first channel can be set up for the data stream, that is to say for the transmission of the user data, and a separate second channel can be set up for the configuration data link. It is irrelevant whether a separate physical line is provided for the first channel and the second channel or whether the first and second channels are logical channels whose data transmission takes place via a common physical line.

The receive module can be set up to read out status data from registers of the serialization unit during operation, after the configuration process has been completed, by means of the configuration data link. In the case it is advantageous, to also consider these read accesses of the deserialization unit to register addresses in the mapping, and to set up the configuration unit so as to provide the deserialization unit with the status data by means of the configuration data link. The configuration unit is advantageously designed to read out the status data queried by the deserialization unit from registers of the serialization unit of the second series and to make it available at the register addresses, which the deserialization unit reads to query the status data. The configuration device is particularly advantageously set up in order to reformat or scale at least one status data item for the deserialization unit by means of the mapping before it is stored.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
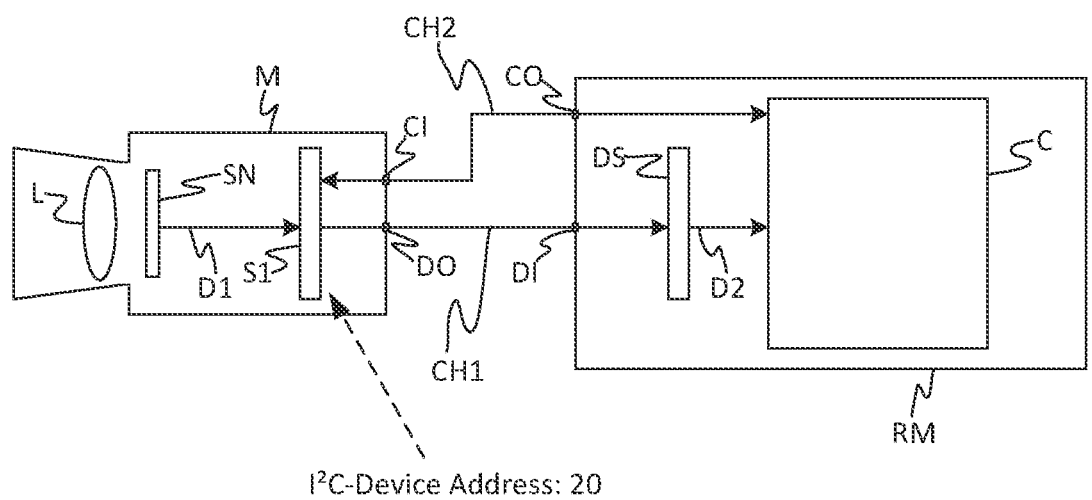
FIG. 1 shows a driver assistance system known from the conventional art with an imaging sensor.

The driver assistance system shown in the illustration of FIG. 1 comprises, as module M, a camera with a lens L and, as a functional unit, a camera sensor SN, which converts the image projected by the lens L into a data stream of digital image data and transmits the digital image data via a first internal data link D1 to a serialization unit S1, which is built into the module M and belongs to a first series and is set up to serialize the data stream and to output it through a data output DO of the module M. The driver assistance system also includes a receive module RM with a deserialization unit DS, which is set up to receive the data stream from a data input DI of the receive module, to deserialize it and to transmit it via a second internal data link D2 to a processing unit C set up to process the data stream. The processing unit C can comprise a large number of components, for example a unit for preprocessing the image data transmitted by the data stream, a microprocessor, RAM memory blocks or bus adapters for transmitting data to a vehicle bus, e.g. CAN, FlexRay or Ethernet. The receive module RM can also include an interface for connecting the receive module RM to a control device, which is provided to intervene in the steering of a vehicle on the basis of data supplied by the receive module RM.

A data link CH1 for transmitting the data stream from the serialization unit S1 to the deserialization unit DS is set up between the data output DO and the data input DI.

The module M comprises a configuration data input CI for receiving configuration data, which represents an interface to an I²C bus in the module M, with the aid of which the receive module RM can access the configuration registers of the serialization unit S1. A unique address is assigned to each configuration register. According to the I²C standard, each register address includes a device address. The serialization unit is located, for example, at device address 20. Each register address also includes a sub address by means of which individual registers can be addressed within the serialization unit S1. The receive module RM comprises a configuration data output CO, and a configuration data link CH2 is set up between the configuration data output CO and the configuration data input CI.

The processing unit C is set up to store configuration data that defines a register configuration of the serialization unit S1 in the module M before the start of the transmission of the data stream via the configuration data output CO. This is done in such a way that the processing unit C uses the configuration data link CH2 to access register addresses of the I²C bus in order to store data in the registers according to the desired register configuration. The processing unit C can also read registers of the serialization unit S1 via the configuration data link CH2 during operation, i.e. after the start of the transmission of the data stream, in order to read out status data from the registers, for example a temperature of the deserialization unit S1 or an error message.

The module M and the receive module RM with the data links CH1, CH2 set up between them, form a uniform computer system in their entirety. That is, the module M and the receive module RM are provided for joint operation, as described above. Therefore, in the design of the receive module RM, it is known to which series the serialization unit S1 belongs and under which addresses their individual registers are accessible. Accordingly, a deserialization unit DS provided for joint operation with the serialization unit S1 is installed in the receive module, and processing unit C is set up to configure serialization unit S1, which is provided for module M with the intended register addressing in the desired manner.

Figure 2:
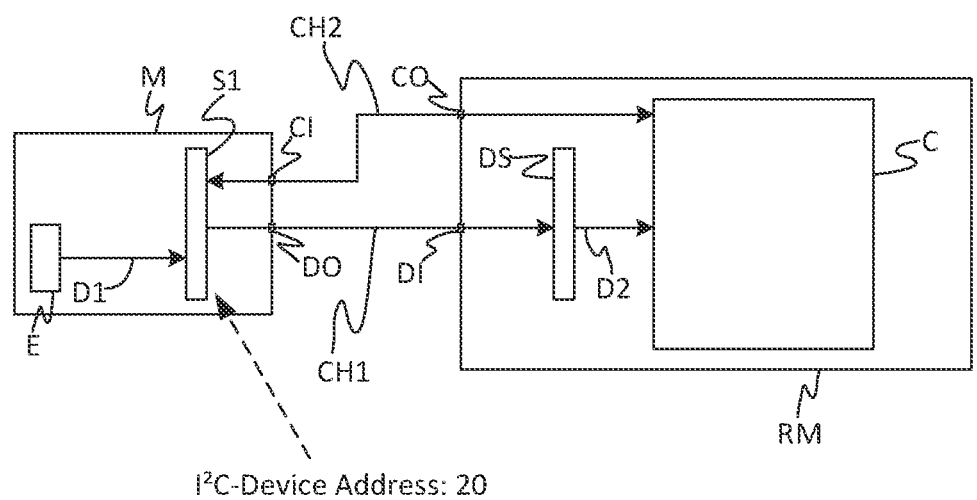
FIG. 2 shows a development system known from the conventional art for a driver assistance system with a module for generating emulated raw sensor data.

In the illustration of FIG. 2, the receive module RM is identical to that shown in FIG. 1, but the module M has been replaced by a development system corresponding to the state of the art, which is set up for safe testing of the receive module RM to generate a data stream of emulated sensor raw data. Such development systems are used in hardware-in-the-loop simulators (HILs) to provide a virtual test environment for advanced driver assistance systems. Only the differences from FIG. 1 are explained below.

The functional unit in the module M is an emulator unit E. The latter includes, for example, a graphics processor (GPU) that renders an image based on a virtual test environment simulated on a simulation computer (not shown) and, for example, emulates the lens L, and an FPGA (Field Programmable Gate Array), which emulates the camera sensor SN, thereby produces a data stream of image data in a realistic manner, such as the camera sensor SN would produce it, and transmits the former to the serialization unit S2 via the first internal data link D1.

The task of the module M is therefore to emulate the presence of the camera system shown in FIG. 1 for the receive module RM. Since the receive module RM, as previously described, expects the presence of a serialization unit of the first series S1 at the device address 20 in the module M, a corresponding serialization unit is held in the module M at the corresponding device address. Accordingly, in the prior art, a serializer board is installed in the individual module M as per each customer's requirements.

Figure 3:
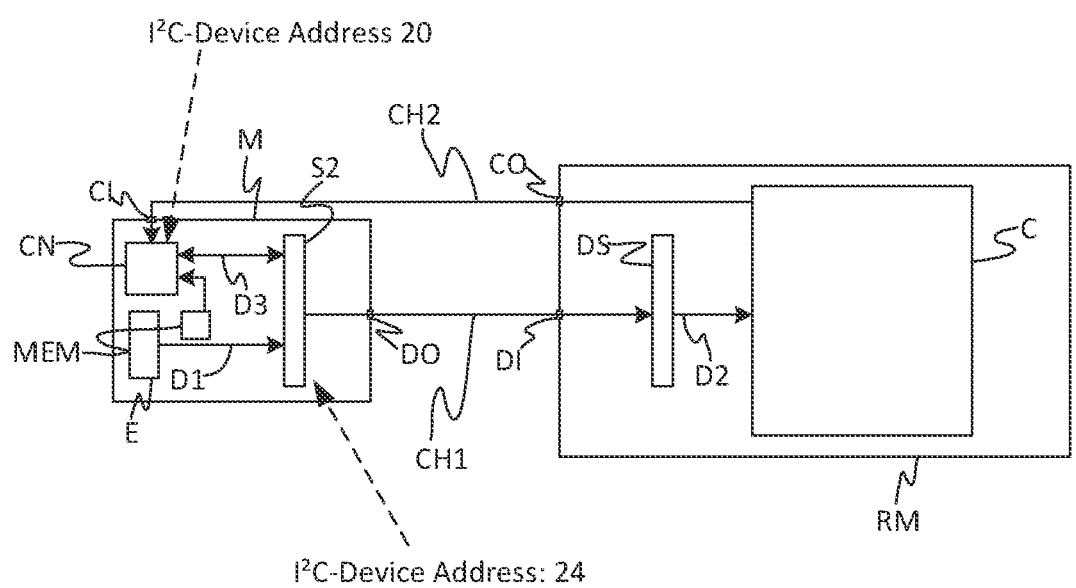
FIG. 3 shows a development system designed according to an exemplary embodiment of the invention for such a driver assistance system.

The illustration of FIG. 3 shows a computer system with a module M configured according to the invention. In the following, only the differences to the previous figures will be explained.

The module M is a development system similar to that shown in FIG. 2, but the serialization unit S2 built into it belongs to a second series that is not intended for joint operation with the deserialization unit DS, and the module M includes a configuration unit CN, which is set up to read in the configuration data from the configuration data input CI. The device address of the configuration unit CN is the address which, from the point of view of the processing unit C, is actually intended for the serialization unit of the first series S1, in the following case the I²C device address 20. The serialization unit of the second series S2 actually installed in module M is assigned a different device address, for example the I²C device address 24. All accesses, which the processing unit C makes to register addresses, accordingly access sub addresses of the configuration unit CN, for example registers of the configuration unit CN. By assigning different device addresses to the configuration unit CN and the serialization unit of the second series S2, the duplicate allocation of register addresses is avoided. The receive module RM accesses a first set of register addresses that exclusively includes sub addresses of the configuration unit, and the sub addresses of the serialization unit of the second series S2 form a second set of register addresses that the configuration unit CN, but not the receive module RM, is set up to access.

The configuration data stored by the processing unit C using the register accesses defines a first register configuration of the serialization unit of the first series S1. A first mapping of register addresses of the serialization unit of the first series S1 to register addresses of the serialization unit of the second series S2 is stored in a data memory MEM of the module M. The mapping is information on the basis of which the configuration unit CN is set up to translate the first register configuration into a second register configuration, which can be applied to the serialization unit of the second series S2 but technically corresponds to the first register configuration. By means of the second register configuration, the serialization unit of the second series S2 can be configured in such a way that it behaves during operation like a serialization unit of the first series S1 configured in accordance with the first register configuration. The configuration unit CN is also set up to access the register addresses of the serialization unit of the second series S2 by means of a third internal data link D3 integrated in the I²C bus, and to configure the serialization unit of the second series S2 according to the second register configuration.

If the processing unit C is set up to read out status data from a serialization unit of the first series during operation, the configuration unit CN also provides the appropriate status data at the register addresses, which the processing unit C read accesses to read out the status data. The configuration unit CN uses the information stored in the mapping to read the status data from the registers of the serialization unit of the second series S2, reformatting or scaling it if necessary and storing it for the processing unit C at the correct register addresses.

In this way, the configuration unit CN emulates the presence of the serialization unit of the first series S1, which is provided for the receive module RM at the designated device address, for the processing unit C, or more generally for the receive module RM. The module M is configurable by a simple deposit of an appropriate mapping on the memory module MEM for operation with deserialization units DS of different series, provided that the serialization unit of the second series S2 and the respective deserialization unit DS are compatible with respect to the transmission of the data stream on the data link CH1.

The module M is also set up, if necessary, to emulate the functionality of other imaging sensors, that is to say, for example, to generate a data stream from emulated radar image data. Apart from that, it is not mandatory according to the invention for the module to be set up to emulate an imaging sensor. An implementation of the invention is also possible in a system for playing back a recording of raw sensor data ("data replay") or in a real imaging system, for example a camera system such as that shown in FIG. 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A module comprising:
   a functional unit to generate a data stream;
   a data output to output the data stream to a deserialization unit in a periphery of the module, the deserialization unit being provided for receiving a data stream from a serialization unit of a first series;
   a serialization unit of a second series, which comprises registers to configure the serialization unit and is set up to serialize the data stream and to output it through the data output; and
   a configuration data input to receive configuration data, which data defines a first register configuration of a serialization unit;
   a data memory on which a first mapping of register addresses of the serialization unit of the first series to register addresses of the serialization unit of the second series is stored or can be stored; and
   a configuration unit that is set up to read in the configuration data from the configuration data input using the mapping to translate the first register configuration defined by the configuration data into a technically corresponding second register configuration via which the serialization unit of the second series is configured such that the serialization unit of the second series behaves during operation like a serialization unit of the first series that is configured according to the first register configuration, and to configure the registers of the serialization unit of the second series in accordance with the second register configuration.

2. The module according to claim 1, wherein the functional unit is set up to generate a data stream of raw sensor data or emulated raw sensor data for emulating a sensor or raw sensor data played back from a recording.

3. The module according to claim 1, further comprising an interface for storing a mapping on the data memory.

4. The module according to claim 1, wherein, in the data memory, a first mapping of register addresses of a serialization unit of the first series to register addresses of the serialization unit of the second series is stored, and at least a second mapping of register addresses of a serialization unit of a third series to register addresses of the serialization unit of the second series is stored.

5. The module according to claim 1, wherein the mapping comprises at least one mapping rule that includes:
   reformatting or scaling of a data item to be stored in at least one register of the serialization unit of the first series; and/or
   a mapping of a first data item, which is provided for depositing in a first number of registers of the serialization unit of the first series, to a second data item, which is provided for depositing in a second number of registers of the serialization unit of the second series.

6. A computer system comprising:
   a module according to claim 1;
   a receive module with a deserialization unit set up to receive the data stream and a configuration data output, which is set up to output configuration data via the configuration data output so as to configure a serialization unit; and a configuration data link set up between the configuration data output and the configuration data input.

7. The computer system according to claim 6, wherein a first channel is set up for the transmission of the data stream and a second channel is set up for the configuration data link.

8. The computer system according to claim 6, wherein the configuration data link is set up as an $I^2C$ bus, as an SPI bus, or as a UART bus.

9. The computer system according to claim 6, wherein the receive module is set up to deposit the configuration data at a set of register addresses, which is provided for the registers of the serialization unit of the first series in the module, and the configuration unit is set up to read in the configuration data stored in the set of register addresses.

10. The computer system according to claim 9, wherein the set of register addresses refers to registers or data inputs of the configuration unit.

11. The computer system according to claim 6, wherein the receive module, after completion of the configuration of the serialization unit of the second series, is set up to read in status data of the serialization unit of the second series via the configuration data link, wherein the mapping comprises at least one mapping rule for reformatting or scaling a status data item, and wherein the configuration unit is set up to read out the status data from the serialization unit of the second series to scale or reformat at least one status data item via the mapping and to provide the receive module with the status data item via the configuration data link.

* * * * *